(12) United States Patent
Sonstroem

(10) Patent No.: US 7,576,791 B2
(45) Date of Patent: Aug. 18, 2009

(54) METHOD AND APPARATUS FOR SIGNATURE REDUCTION USING WAVEFRONT CODING

(75) Inventor: Jaime Sonstroem, Springfield, VA (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 780 days.

(21) Appl. No.: 11/110,993

(22) Filed: Apr. 20, 2005

(65) Prior Publication Data
US 2006/0238638 A1    Oct. 26, 2006

(51) Int. Cl.
*H04N 5/225* (2006.01)
*G01J 5/02* (2006.01)
(52) U.S. Cl. .................. 348/335; 250/352; 250/353
(58) Field of Classification Search ............... 348/335; 250/339.14, 341.8, 342, 495.1
See application file for complete search history.

(56) References Cited

U.S. PATENT DOCUMENTS

| | | | | |
|---|---|---|---|---|
| 4,497,065 | A * | 1/1985 | Tisdale et al. ............... | 382/103 |
| 5,986,746 | A * | 11/1999 | Metz et al. .................. | 356/71 |
| 6,097,856 | A * | 8/2000 | Hammond, Jr. ............. | 382/312 |
| 6,353,489 | B1 * | 3/2002 | Popovich et al. ............. | 359/15 |
| 6,515,285 | B1 * | 2/2003 | Marshall et al. ............. | 250/352 |
| 6,862,147 | B1 * | 3/2005 | Sonstroem .................. | 359/738 |
| 6,974,219 | B1 * | 12/2005 | Geneczko et al. .......... | 359/613 |
| 2003/0063384 | A1 * | 4/2003 | Dowski, Jr. ................. | 359/558 |
| 2004/0165253 | A1 * | 8/2004 | Cathey et al. ............... | 359/322 |
| 2004/0190762 | A1 * | 9/2004 | Dowski et al. .............. | 382/128 |
| 2004/0228005 | A1 * | 11/2004 | Dowski, Jr. ................. | 359/671 |
| 2004/0246441 | A1 * | 12/2004 | Stark et al. .................. | 351/205 |
| 2006/0109903 | A1 * | 5/2006 | Bergen et al. .......... | 375/240.12 |
| 2006/0256226 | A1 * | 11/2006 | Alon et al. .................. | 348/335 |

OTHER PUBLICATIONS

Narayanswamy, et al. "Extended depth-of-field iris recognition system for a workstation environment", Mar. 28, 2005, Proc. SPIE, vol. 5779, pp. 41-50.*

* cited by examiner

*Primary Examiner*—Tuan V Ho
*Assistant Examiner*—Kent Wang
(74) *Attorney, Agent, or Firm*—John H. Raubitschek; Richard J. Kim

(57) ABSTRACT

The invention applies wavefront coding to the front of an electro-optic/infrared device to minimize the amount of light which is retroreflected by systems, such as Fowarding Looking Infrared systems, back to its source. The invention (unlike conventional reduction methods) does not rely on reducing the laser power leaving the interrogated sensor, but primarily on controlling its direction. A sensor according to the present invention, which has been wavefront coded for reduction of reflected light, will also effect the direction of the scattered light, thereby significantly reducing that which returns to the zero bistatic angle position. In contrast, a limitation of conventional methods is that once specular reflections are addressed, the remaining retroreflected signal typically results from scattered light at the focal plane which is largely collected and recollimated by the system optics.

19 Claims, 2 Drawing Sheets

Phaseplate Surface

METHOD AND APPARATUS FOR SIGNATURE REDUCTION USING WAVEFRONT CODING

GOVERNMENT INTEREST

The invention described herein may be manufactured, used, sold, imported, and/or licensed by or for the Government of the United States of America.

FIELD OF INTEREST

This invention relates to electro-optic and infrared devices and reducing the retro-reflectivity of these devices and in particular of Forward Looking Infrared (FLIR) systems.

BACKGROUND OF THE INVENTION

Infrared (IR) staring sensors are well known in the prior art for obtaining data in the IR spectrum. Typically, these sensors include an optical train that minimizes the optical blur spot at the focal plane. The optical train receives the optical rays through an aperture, and then directs the incoming IR optical rays onto a focal plane array (FPA) for further processing and display by other components of the device. One of the disadvantages of these devices, however, is that during operation, a portion of the incoming IR radiation actually reflects off the focal plane array, passes back through the optical device and leaves the device through the aperture as an IR emission signal. This phenomenon is known as retro-reflectivity.

It is desirable that the retro-reflectivity for the device be minimized, so that the IR staring sensor is undetectable during operation of the device. One such device that minimizes the retro-reflectivity of IR staring sensors is described in U.S. Pat. No. 6,862,147 issued on Mar. 1, 2005 to Sonstroem, which is incorporated herein by reference.

Wavefront Coding

Combining optical and digital signal processing has recently become a very popular method to provide digital sensors with both aberration relief and extended depth of field. This technique is known as Wavefront Coding, and has been described for extended depth of field applications. Military-related research on using this particular method for extended depth of field was also studied.

The practice of enhancing frequency response through processing has been used for many years in both optical and radar imaging systems. Commonly known as frequency "boost", it has been used in optical systems with low noise for enhancing high frequency response for long-range identification. Wavefront Coding employs a very similar method of using a frequency post-filter to enhance the digitally recorded imagery. However, the Wavefront Coding method differs in that it requires a special optical element to be placed in the system optics, which is designed to match characteristics of the digital filter. By designing both the optic and the filter concurrently, the sensor system can be tailored to be invariant to certain aberrations, or have extended depth of field (the most common application).

The special optical element in Wavefront Coding is called a phase mask (or phase plate) because it is used as) an optical phase filter. As such, it is typically placed in or near an aperture stop or pupil plane to modify the wavefront shape (or phase delay) in the pupil. The entrance and exits pupils of any optical system contain all the spatial frequency information for the imaging system, and maintain a direct Fourier Transform relationship with the image. By altering the wavefront in the pupil, one can directly manipulate the spatial frequencies and shape of the system's point spread function (PSF). One can specifically design the surface sag of the phase mask to dominate certain aberrations and produce a PSF that remains invariant to those aberrations.

Given the above, there is a need in the art to reduce an EO/IR system's retro-reflectivity. This invention addresses this need.

SUMMARY OF THE INVENTION

Accordingly, one object of the present invention is to reduce the retro-reflectivity in infrared staring sensors, in particular forward looking infrared (FLIR) systems. The present invention achieves this objective by applying wavefront coding to minimize the amount of light that is retroreflected by the FLIR system back to its source. The present invention (unlike conventional retro-reflectivity reduction methods) does not rely on reducing the laser power leaving the interrogated sensor, but primarily on controlling its direction. A sensor according to the present invention, which has been wavefront coded for reduction of reflected light, will also effect the direction of the scattered light, thereby significantly reducing that which returns to the zero bistatic angle position. In contrast, a limitation of conventional methods is that once specular reflections are addressed, the remaining retroreflected signal typically results from scattered light at the focal plane, which is largely collected and recollimated by the system optics.

BRIEF DESCRIPTION OF THE DRAWINGS

These and other objects of the invention will become readily apparent in light of the Detailed Description of the Invention and the attached drawings wherein.

DETAILED DESCRIPTION OF THE INVENTION

The invention applies wavefront coding to an Electro-Optic/Infrared (EO/IR) device (for example, an infrared staring sensor) such that the retroreflected wavefront can be modified to reduce the signature of the device. Implicit in the wavefront coding technique is the ability to code the wavefront to a specific advantage and then decode it through signal processing. In this case, the advantage is to minimize the amount of light that is retroreflected by a sensor back to its source.

Figure 1:
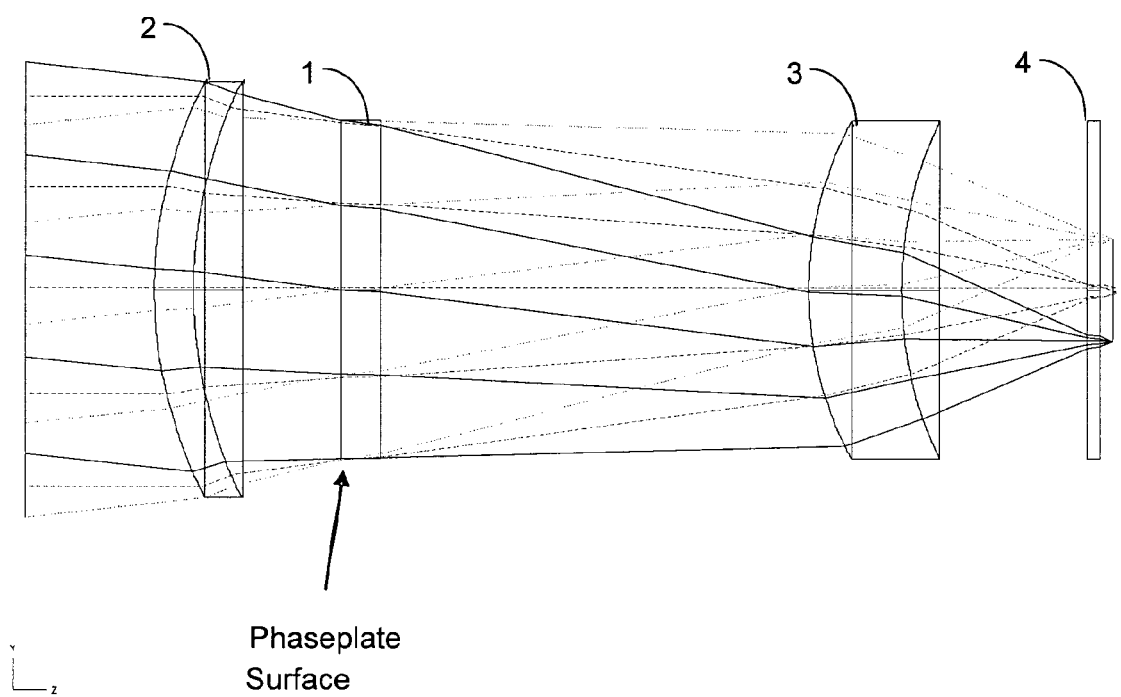
FIG. 1 shows the optical layout of the lens including the phase plate.
Figure 2:
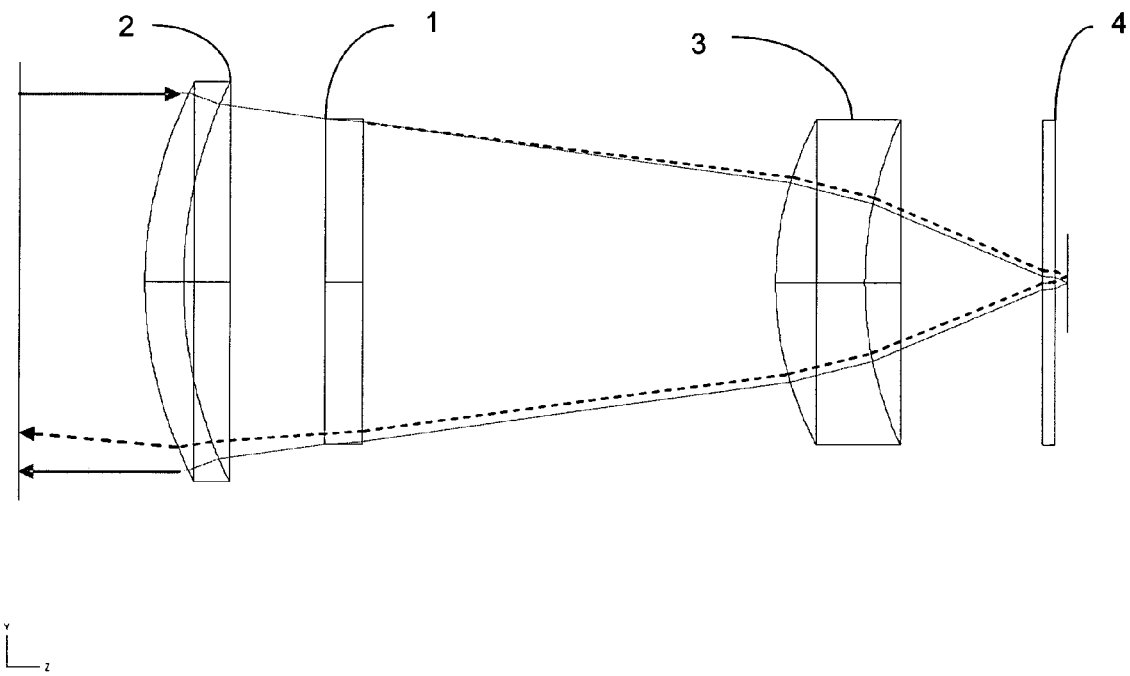
FIG. 2 shows the alteration in the retro-reflectivity of an infrared staring sensor caused by the present invention.

FIGS. 1 and 2 show a preferred embodiment of the invention. FIG. 1 shows an optical train with an optical phase plate at the pupil. Several fields are shown passing through the system and on to the FPA. FIG. 1 illustrates the position of the phase plate but not its effects on the transmitted rays. FIG. 2 illustrates the operation of the optical system on-axis both with and without the effects of the phase plate for retroreflection reduction. During normal operation of the optical system, a ray enters the optical system, is refracted to the focal plane, and when reflected traces its path back out the optical system, thereby departing exactly parallel to the incoming ray (solid lines). Thus, it retroreflects back to the source. If we now consider the action of the phase plate, the same ray, on encountering the phase plate is deviated from its normal path, is refracted to the focal plane and when reflected is further refracted through the system to the phase plate which further deviates its path (dashed lines). Thus, the Wavefront Coded ray does not depart the optical train parallel to the incoming ray, and is not Retroreflected back to the source.

In one embodiment of the invention, the phase plate 1 is placed at the pupil of the optics (between lens 2 and 3 (in a telescope configuration)) in order to modify the retroreflected wavefront coming back into the system from the source. This is illustrated in FIG. 1. Those skilled in the art of Wavefront coding will recognize that the phase plate can be tailored to minimize the retroreflection effect. Those skilled in the art of Wavefront coding will also recognize that the optical aberrations resulting from the phase plate can and must be compensated by image processing techniques to restore the image.

One way of testing the retro-reflectivity of a infrared staring sensors is by using a system that consists of a laser source and co-located receiver optic and detector. As the system scans the infrared staring sensor, true retroreflections from the sensor return to the laser source/receiver (the angle between the source and receiver is known as bistatic angle and should ideally be near-zero, the monostatic condition). In general, if the sensor has near diffraction-limited optics, then the retroreflected beam forms an Airy-like pattern back at the receiver, with the highest intensity of the Airy pattern centered on the receiver, at zero bistatic angle. The opportunity with wavefront coding is to tailor the retroreflected wavefront to have a null or local minimum at the zero bistatic position.

The invention, therefore, (unlike all conventional reduction methods to date) does not rely on reducing the laser power leaving the interrogated sensor, but primarily on controlling its direction. A sensor, according to the invention, which has been wavefront coded for reduction of reflected light should also affect the direction of the scattered light, significantly reducing that which returns to the zero bistatic angle position. This is in contrast to the inherent limitation of conventional methods that once specular reflections are addressed, the remaining retroreflected signal typically results from scattered light at the focal plane (That which is largely collected and recollimated by the system optics).

Table 1 below summarizes advantages and disadvantages specific to implementing wavefront coding for reducing the retro-reflectivity in sensor systems. The table notes that the location of the phase plate is the primary issue. This is listed as a disadvantage since many sensors of interest are already designed, and the pupil location is not friendly to insertion of a phase plate. An additional concern is that sensors with two or more fields-of-view might require a moving phase plate or two or more phase plates. These are very practical concerns for some applications which must be considered up front.

TABLE 1

ADVANTAGES AND DISADVANTAGES SPECIFIC TO IMPLEMENTING WAVEFRONT CODING FOR SIGNATURE REDUCTION IN SENSOR SYSTEMS

| ADVANTAGES | DISADVANTAGES |
| --- | --- |
| Can potentially be tailored to minimize light retroreflected to a source | Phase plate needs to be located at a pupil—not always straightforward |
| Can help reduce scattered as well as specular reflections | Difficult to implement in sensors with multiple fields-of-view |

Experimental results showed rather minimal reduction in the signature using a cubic phaseplate. Modeling, however, demonstrated that the cubic phase function is not appropriate for the signature reduction application due to the perfect negative phase symmetry of the phaseplate surface. An appropriate phase function would do just the opposite upon retroreflection, adding to the initial phase errors on the second pass.

Therefore, given particular applications, the phase plate can be made a part of the lens or at a minimum should be positioned at the pupil of the sensor. Based on this positioning, one skilled in the art could devise a method to process the signals to optimize the direction of the signal being retroreflected from the sensor, but also permit the sensor to clearly depict the images it is receiving.

What is claimed is:

1. A low-signature wavefront-coded electric-optic system comprising:
    at least one lens;
    a phase plate;
    a focal plane array; and
    a means to reconstruct an image
    wherein the phase plate has been specifically designed and positioned within the system such that light originating from an external source and entering the system, passes through the phase plate, reflects off the focal plane array, passes again through the phase plate and exits the system and is not retroreflected back to the source.

2. The electric-optic system of claim 1 wherein the electric-optic system is a forward looking infrared device.

3. The electro-optic system of claim 1 wherein the electro-optic system is a TV camera.

4. The electro-optic system of claim 1 wherein the electro-optic system is an IITV camera.

5. electro-optic system of claim 1 comprising a second lens, the lens being placed in a telescope configuration and the phase plate is placed between the lenses.

6. The electro-optic system of claim 1 wherein wavefront coding as accomplished by the phase plate is tailored such that the retroreflected wavefront is minimal at a zero bistatic position.

7. The electro-optic system of claim 4 wherein the phase plate effects the direction of the scattered light of the retroreflected wavefront.

8. The electro-optic system of claim 1 wherein the focal plane array is uncooled.

9. The electro-optic system of claim 1 wherein the phase plate is placed at the pupil of the sensor.

10. The electro-optic system of claim 1 wherein the phase plate is part of the lens.

11. The electro-optic system of claim 1 wherein the phase plate is positioned so as to alter the direction of any retroreflected signal emanating from the electro-optic system.

12. A method of reducing a signature in an electro-optic system comprising the steps of:
    providing at least one lens;
    providing a phase plate;
    providing a focal plane array; and
    positioning the phase plate within the system such tat light originating from an external source and entering the system, passes through the phase plate, reflects off the focal plane array, passes again through the phase plate, and exits the system and is not retroreflected back to the source.

13. The method of claim 12 wherein electro-optic system is a forward looking infrared device.

14. The method of claim 12 comprising providing a second lens the lenses being placed in a telescoping configuration and the phase place is placed between the lenses.

15. The method of claim 12 wherein wavefront coding as accomplished by the phase plate is tailored such that the retroreflected wavefront is minimal at a zero bistatic position.

16. The method of claim 15 wherein the phase plate effects the direction of the scattered light of the retroreflected wavefront.

17. The method of claim 12 wherein the focal plane array is uncooled.

18. The method of claim 12 wherein the phase plate is placed at the pupil of the sensor.

19. The method of claim 12 wherein the phase plate is part of the lens.

* * * * *